United States Patent [19]

Perfetti

[11] 4,091,131

[45] May 23, 1978

[54] NONPERISHABLE DIRECT ENAMELING STEEL AND METHOD FOR PRODUCING SAME

[75] Inventor: Guido A. Perfetti, Bethlehem, Pa.

[73] Assignee: Bethlehem Steel Corporation, Bethlehem, Pa.

[21] Appl. No.: 615,026

[22] Filed: Sep. 19, 1975

[51] Int. Cl.[2] .......................... B05D 1/36; B05D 7/14; B32B 15/04

[52] U.S. Cl. ................................ 427/386; 427/388 R; 427/388 A; 428/341; 428/457

[58] Field of Search ................ 428/341, 457; 427/386, 427/388 R, 388 A

[56] References Cited

U.S. PATENT DOCUMENTS

| | | | |
|---|---|---|---|
| 2,186,018 | 1/1940 | Griesinger | 428/457 |
| 2,370,300 | 2/1945 | Farrington | 427/386 |
| 2,398,193 | 4/1949 | Sharp | 427/386 |
| 2,434,490 | 1/1948 | Duncan | 427/386 |
| 2,443,578 | 6/1948 | Fuller et al. | 427/386 |
| 2,444,328 | 6/1948 | Blair | 427/386 |
| 2,485,341 | 10/1949 | Wasson et al. | 427/386 |
| 2,527,889 | 10/1950 | Moore et al. | 427/386 |
| 2,563,609 | 8/1951 | Maturzak | 427/386 |
| 2,587,545 | 2/1952 | Sproule | 427/386 |
| 2,884,338 | 4/1959 | Jenison | 427/386 |
| 2,884,338 | 4/1959 | Jenison | 428/457 X |
| 3,726,704 | 4/1973 | Shimada | 428/457 |
| 3,826,675 | 7/1974 | Smith et al. | 427/386 |
| 3,941,910 | 3/1976 | Asano et al. | 428/457 |

FOREIGN PATENT DOCUMENTS

| | | | |
|---|---|---|---|
| 49-73,343 | 7/1974 | Japan | 427/386 |

*Primary Examiner*—James R. Hoffman
*Attorney, Agent, or Firm*—Joseph J. O'Keefe; Charles A. Wilkinson; Michael Leach

[57] ABSTRACT

A steel composite exhibiting both corrosion resistance and direct enamelability is produced by coating the steel substrate with a layer of between about 1 and about 15 grams per base box of a synthetic ester selected from the group consisting of pentaerythrityl dioleate and pentaerythrityl tetraoleate.

16 Claims, No Drawings

NONPERISHABLE DIRECT ENAMELING STEEL AND METHOD FOR PRODUCING SAME

BACKGROUND OF THE INVENTION

Numerous oiling compounds are used as temporary corrosion preventatives to prevent the formation of rust on the surface of ferrous sheets, strips and other flat ware products during storage and transportation between the producer and the final user. These oiling compounds are, however, usually either not compatible with direct enameling of the steel surface or not pharmacologically acceptable for use in making food and beverage containers. Various anti-oxidation agents have also been available, many of which are compatible with direct enameling, but which are not pharmocologically safe. These various oiling compounds and anti-oxidation agents must, therefore, at least, when used in amounts which are effective to prevent commercially objectionable rusting of a steel surface, be subsequently removed from the surface by an expensive cleaning operation prior to enameling. Some compounds have been available such as dioctyl sebacate or analogous compounds which can be applied to tinplate, electrolytic chromium coated steel and blackplate to render the sheets mobile and scuff resistant. These compounds do not interfere with enameling in the small amounts in which they are used. However, these small amounts are not effective in preventing the appearance of rust on the metal surface and the use of greater amounts of the compounds is incompatible with direct enameling.

Certain compounds such as pentaerythrityl oleates, which are pharmocologically acceptable, have in the past been mixed with enameling compounds and applied to the surface of steel sheets during enameling of the sheets. During curing of the enamel layer the pentaerythrityl compounds migrate to the outer surface of the enamel layer where they serve as pharmocologically safe mobility inducing and anti-scuffing agents which allow the enameled sheets to be readily piled or stacked and subsequently withdrawn from the pile one at a time without damage to the enameled surface. Any prior corrosion preventative used directly on the surface of the original steel sheet for temporary rust prevention prior to enameling would still, however, have to be removed from the surface prior to the enameling step.

There has thus been a need for a temporary but effective rust preventative for application to the bare surface of steel sheets and the like which is both compatible with subsequent direct enameling and pharmocologically unobjectionable.

It is therefore an object of this invention to provide a composite steel sheet product which resists corrosion.

It is a further object of this invention to provide a corrosion resistant composite steel product which is directly enamelable.

It is also an object of this invention to provide a method for treating a steel sheet material so as to impart thereto corrosion resistance while maintaining direct enamelability.

SUMMARY OF THE INVENTION

It has now been discovered that a steel substrate coated with a layer of a synthetic ester such as either pentaerythrityl dioleate or pentaerythrityl tetraoleate effectively resists corrosion during the period prior to enameling and is directly enamelable without the necessary step of removing the corrosion-preventative ester layer.

DESCRIPTION OF THE PREFERRED EMBODIMENT

The following description will provide those skilled in the art with a clear understanding of my basic invention as well as its alternative embodiments.

Substrate

Blackplate has been used in most instances as the substrate upon which pentaerythrityl dioleate and pentaaerythrityl tetraoleate have been used as a corrosion preventative coating due to its economic superiority in the container manufacturing process in which the product has been used. Nevertheless I do not wish to be limited to the use of blackplate as substrate in my process since such process is equally useful with any steel substrate which has a tendency to corrode and which forms a rust resistant composite when coated in accordance with this invention.

Synthetic Ester Coating

The dioleate and the tetraoleate of the quadrafunctional alkanol pentaerythritol were chosen as the synthetic esters to be used in the majority of experiments run due to the demonstrated compatibility of both esters with the substrate and with organic resin enamels. While my claims are directed solely to the use of these two esters, I contemplate, as operative equivalents thereto, the use of any synthetic ester produced by reaction between a 3–6 carbon polyol and a 14–29 carbon mono carboxylic acid. Such contemplated equivalency is predicated upon the similarity of chemical and physical properties exhibited by such a subclass of synthetic esters. Among such relevant similarities are: viscosity, surface tension, melting point, etc.

Solvent for Ester

The ester layer may be applied without solvent. However, in order to simplify the application of a thin, uniform layer of synthetic ester onto the steel substrate, a dilute solution of the ester may be made initially, using a hydrocarbon solvent. While xylene was used as a solvent in the bulk of the experiments performed and disclosed herein, any hydrocarbon in which the ester is soluble and which exhibits the following three characteristics will be found to be a suitable equivalent. These characteristics are (1) Substantial volatility at ambient or only moderately elevated temperatures;
(2) Inertness with respect both to the steel substrate and the ester; and
(3) Ability to "wet" the steel substrate.

Methods of Application

Uniform application of the synthetic ester to the substrate may be accomplished by any suitable procedure such as those known to persons skilled in the art including, but not limited to, metering, dipping, spraying or electrostatic deposition.

The essential feature of this invention is the novel use of synthetic esters such as pentaerythrityl dioleate, pentaerythrityl tetraoleate and their equivalents described above to maintain the steel both rust free and directly enamelable, thereby eliminating the prior art necessity of applying various metal preservative compounds, and subsequently removing such compounds prior to coating with an organic enamel.

In large commercial operations, the preferred method of applying the synthetic ester to the steel substrate would be by electrostatic deposition of the undiluted ester. However in both the laboratory and in small, batch type operations, such as the examples described below, I have used the following method:

(1) Dissolving the ester in a compatible hydrocarbon solvent;

(2) Applying a sufficient amount of the solution from (1) to give not less than about one gram per base box (base box = bb = 218 $ft^2$ of metal or 436 $ft^2$ of surface area counting both sides) and not more than about 15 grams per base box of the synthetic ester to all surfaces of the steel substrate for which corrosion resistance and direct enamelability are desired; and (3) Evaporating off the solvent to leave the substrate coated with a layer of synthetic ester in the thicknesses shown in (2).

Examples

In order to demonstrate both the utility of my invention and its superiority over anti-scuff agents which exhibit corrosion resistance at heavier, unenamelable coating weights, the following comparative experiment was run:

Dilute solutions (1–5% in xylene) of pentaerythrityl dioleate, pentaerythrityl tetraoleate, dioctyl sebacate, and acetyl tributyl citrate, were sprayed onto substrates made from 20 micro-inch AA and 40 micro-inch AA (tin-mill finish) blackplate so as to yield, after solvent evaporation, coating weights of 1, 3 and 5 grams of coating per base box). These composites were then subjected to air at 85% Relative Humidity at 85° F alongside untreated blanks for a period of 5 weeks. At the end of this test period, the composites were removed and the number of rust specks 0.020 of an inch or greater in any direction were counted.

The results of these tests are reproduced in Table I.

TABLE I

| | No. of Rust Specks/18 in² After Five Weeks at 85° F/85% Rel. Hum.* | | | | | |
|---|---|---|---|---|---|---|
| | 20 μ-in AA Surface | | | 40 μ-in AA Surface | | |
| | 1 g/bb | 3 g/bb | 5 g/bb | 1 g/bb | 3 g/bb | 5 g/bb |
| Pentaerythrityl Dioleate | 9 | 2 | 2 | 7 | 2 | 2 |
| Pentaerythrityl Tetraoleate | >300<400 | 1 | 2 | >400<500 | 0 | 0 |
| Dioctyl Sebacate | 37 | 39 | 36 | 24 | 12 | 12 |
| Acetyl Tributyl Citrate | >500 | >500 | >500 | >500 | >500 | >500 |
| Dry Blackplate | | >5000 | | | >5000 | |

*Specks 0.020 of an inch or greater in any direction.Majority of specks are 0.040 of an inch or larger.

From the data shown in Table I it is evident that even at the lightest coating weight (1 g/bb) pentaerythrityl dioleate is between about three and 50 times as effective as DOS or ATBC. At the slightly heavier coating weights of 3 and 5 g/bb, both the dioleate and the tetraoleate demonstrate an approximately 20-fold superiority over dioctyl sebacate and at least a 250 fold superiority over acetyl tributyl citrate.

Since the corrosivity of industrial environments, the average time of exposure, and the maximum amount of incipient rusting which may be accepted by various customers, will vary in some degree, the effective amount of the pentaerythrityl oleates which will prevent a commercially unacceptable degree of rusting may be less than that set forth above under some circumstances. By an "effective amount", therefore, it is meant that sufficient penetaerythrityl dioleate or tetraoleate is present to prevent such amount of rusting as would render the product commercially unacceptable or unsaleable for its intended use. Commercially available electrostatic application apparatus will be found to be useful for applying the compounds of the invention in very thin layers. It is usually not necessary for the pentaerythrityl oleates of the invention to be pure since the usual industrial grade of such compounds will almost invariably be found to be quite effective in preventing commercially unacceptable rusting. Industrial grade pentaerythrityl oleates may include various amounts of mono- and tri-oleates and other closely related fatty acid esters as minor constituents depending upon the purity of the starting materials from which the esters are produced.

While the ester coating must prevent rust formation in order to be useful, it must also be compatible with direct enameling. To test such compatibility of both the di- and tetraoleate esters of pentaerythritol, and to compare such compatibility with that exhibited by dioctyl sebacate and acetyl tributyl citrate, a second series of experiments was performed with substrates prepared in an identical manner to those used in the corrosion prevention experiments. Each blank was then treated according to the following procedure.

A typical epoxy phenolic formulation was applied to each blank by roll coating both sides of the substrate to a dry film weight of 10–20 mg. The aforementioned epoxy phenolic comprised approximately:

33% by weight solids consisting of about:
- 155 parts by weight epichlorohydrin bisphenol A epoxy resin (medium molecular wt.)
- 45 parts by weight of allyl ether of methylol phenol resin
- 1 part by weight phosphoric acid catalyst, and 67% by weight solvent consisting of about:
- 5 parts by weight iso-butanol
- 9 parts by weight xylene
- 4 parts by weight pentoxone
- 4 parts by weight diacetone alcohol
- 4 parts by weight isophorone
- 7 parts by weight mesityl oxide The organic coated substrates were then heated in a batch type enameling oven and air cooled to room temperature. Each substrate sample was then visually inspected for continuity defects. The results of such inspection are shown in Table II.

TABLE II

ENAMELABILITY OF BLACKPLATE FILMED WITH VARIOUS ESTERS*

| | Film Weight, g/bb | | | | | |
|---|---|---|---|---|---|---|
| | 20 μ-in AA Surface | | | 40 μ-in AA Surface | | |
| | 1 g/bb | 3 g/bb | 5 g/bb | 1 g/bb | 3 g/bb | 5 g/bb |
| Pentaerythrityl Dioleate | A | A | A | A | A | A |
| Pentaerythrityl Tetraoleate | A | A | A | A | A | A |
| Dioctyl Sebacate | U | U | U | U | U | U |
| Acetyl Tributyl Citrate | U | U | U | A | U | U |

*Enamelability is based on whether or not enamel film exhibits any continuity defect. "A" denotes acceptable; "U" denotes unacceptable because of such defect.

As indicated in Table II, with one exception those blanks coated with 1, 3 and 5 grams of DOS and ATBC exhibited sufficient amounts of enamel continuity defects to make their commercial acceptability unsatisfactory, while the samples coated with the di- and tetraoleates of pentaerythritol exhibited no such defect. It is thus apparent that pentaerythrityl dioleate and pentaerythrityl tetraoleate, when applied to a steel substrate, both provide corrosion resistance to the substrate and result in no decrease in the direct enamelability of such substrate. Such results are surprising and unexpected in view of their superiority to other anti-scuff agents such as dioctyl sebacate and acetyl tributyl citrate.

While not specifically described herein, experiments conducted during development of this invention have shown that, coating weights in excess of 15 g/base box of pentaerythrityl dioleate and pentaerythrityl tetraoleate, cause the enamel film to exhibit significant continuity defects, making such ester coating weights unacceptable for direct enameling use.

I claim:

1. A corrosion resistant, directly enamelable and pharmacologically acceptable composite comprising:

(a) a steel substrate; and (b) a corrosion resistant, directly enamelable and pharmacologically acceptable coating layer upon the surface of the steel substrate consisting essentially of at least one compound selected from the group consisting of pentaerythrityl dioleate and pentaerythrityl tetraoleate, the coating layer being present in an amount of not greater than about 15 grams per base box.

2. A corrosion resistant, directly enamelable and pharmacologically acceptable composite according to claim 1 wherein the coating layer is present in an amount of from about 1 to about 15 grams per base box.

3. A corrosion resistant, directly enamelable and pharmacologically acceptable composite according to claim 1 wherein the coating layer is pentaerythrityl dioleate present in an amount of from about 1 to about 15 grams per base box.

4. A corrosion resistant, directly enamelable and pharmacologically acceptable composite according to claim 1 wherein the coating layer is pentaerythrityl tetraoleate present in an amount of from about 3 to about 15 grams per base box.

5. A corrosion resistant, directly enamelable and pharmacologically acceptable composite according to claim 1 wherein the steel substrate is blackplate.

6. A process for treating a steel substrate so as to impart to the steel substrate corrosion resistance while maintaining direct enamelability and pharmacological acceptance comprising coating the surface of a steel substrate with a coating layer consisting essentially of at least one compound selected from the group consisting of pentaerythrityl dioleate and pentaerythrityl tetraoleate, the coating layer being present in an amount of not greater than about 15 grams per base box.

7. A process for treating a steel substrate so as to impart to the steel substrate corrosion resistance while maintaining direct enamelability and pharmacological acceptance according to claim 6 wherein the coating layer is present in an amount of from about 1 to about 15 grams per base box.

8. A process for treating a steel substrate so as to impart to the steel substrate corrosion resistance while maintaining direct enamelability and pharmacological acceptance according to claim 6 wherein the coating layer is pentaerythrityl dioleate present in an amount of from about 1 to about 15 grams per base box.

9. A process for treating a steel substrate so as to impart to the steel substrate corrosion resistance while maintaining direct enamelability and pharmacological acceptance according to claim 6 wherein the coating layer is pentaerythrityl tetraoleate present in an amount of from about 3 to about 15 grams per base box.

10. A process for treating a steel substrate so as to impart to the steel substrate corrosion resistance while maintaining direct enamelability and pharmacological acceptance according to claim 6 wherein the steel substrate is blackplate.

11. A process for enameling a steel substrate having a corrosion resistant, pharmacologically acceptable coating layer comprising:

(a) coating the surface of a steel substrate with a first coating layer consisting essentially of at least one compound selected from the group consisting of pentaerythrityl dioleate and pentaerythrityl tetraoleate, the coating layer being present in an amount of not greater than about 15 grams per base box;

(b) applying a second layer comprised of enameling resin over the first coating layer; and (c) heating the coated steel substrate from step (b) to harden the enameling resin.

12. A process for enameling a steel substrate having a corrosion resistant, pharmacologically acceptable coating layer according to claim 11 wherein the first coating layer is applied in an amount of from about 1 to about 15 grams per base box.

13. A process for enameling a steel substrate having a corrosion resistant and pharmacologically acceptable coating layer according to claim 11 wherein the first coating layer is pentaerythrityl dioleate applied in an amount of from about 1 to about 15 grams per base box.

14. A process for enameling a steel substrate having a corrosion resistant and pharmacologically acceptable coating layer according to claim 11 wherein the first coating layer is pentaerythrityl tetraoleate applied in an amount of from about 3 to about 15 grams per base box.

15. A process for enamling a steel substrate having a corrosion resistant and pharmacologically acceptable coating layer according to claim 11 wherein the steel substrate is blackplate.

16. A process for enameling a steel substrate having a corrosion resistant and pharmacologically acceptable coating layer according to claim 11 wherein the enameling resin is an epoxy phenolic resin.

* * * * *

UNITED STATES PATENT OFFICE
CERTIFICATE OF CORRECTION

Patent No. 4,091,131 Dated May 23, 1978

Inventor(s) Guido A. Perfetti

It is certified that error appears in the above-identified patent and that said Letters Patent are hereby corrected as shown below:

Column 2, line 32, "14-29 car" should read -- 14-20 car --.

Signed and Sealed this

*Thirty-first* Day of *October 1978*

[SEAL]

*Attest:*

RUTH C. MASON
*Attesting Officer*

DONALD W. BANNER
*Commissioner of Patents and Trademarks*